Feb. 17, 1931.  J. R. FREEZE  1,793,282
SPIRAL PIPE FORMING METHOD
Original Filed Dec. 5, 1924  3 Sheets-Sheet 1

INVENTOR.
Jonathan R. Freeze
BY Allen & Allen
ATTORNEYS

Feb. 17, 1931.  J. R. FREEZE  1,793,282
SPIRAL PIPE FORMING METHOD
Original Filed Dec. 5, 1924    3 Sheets-Sheet 2
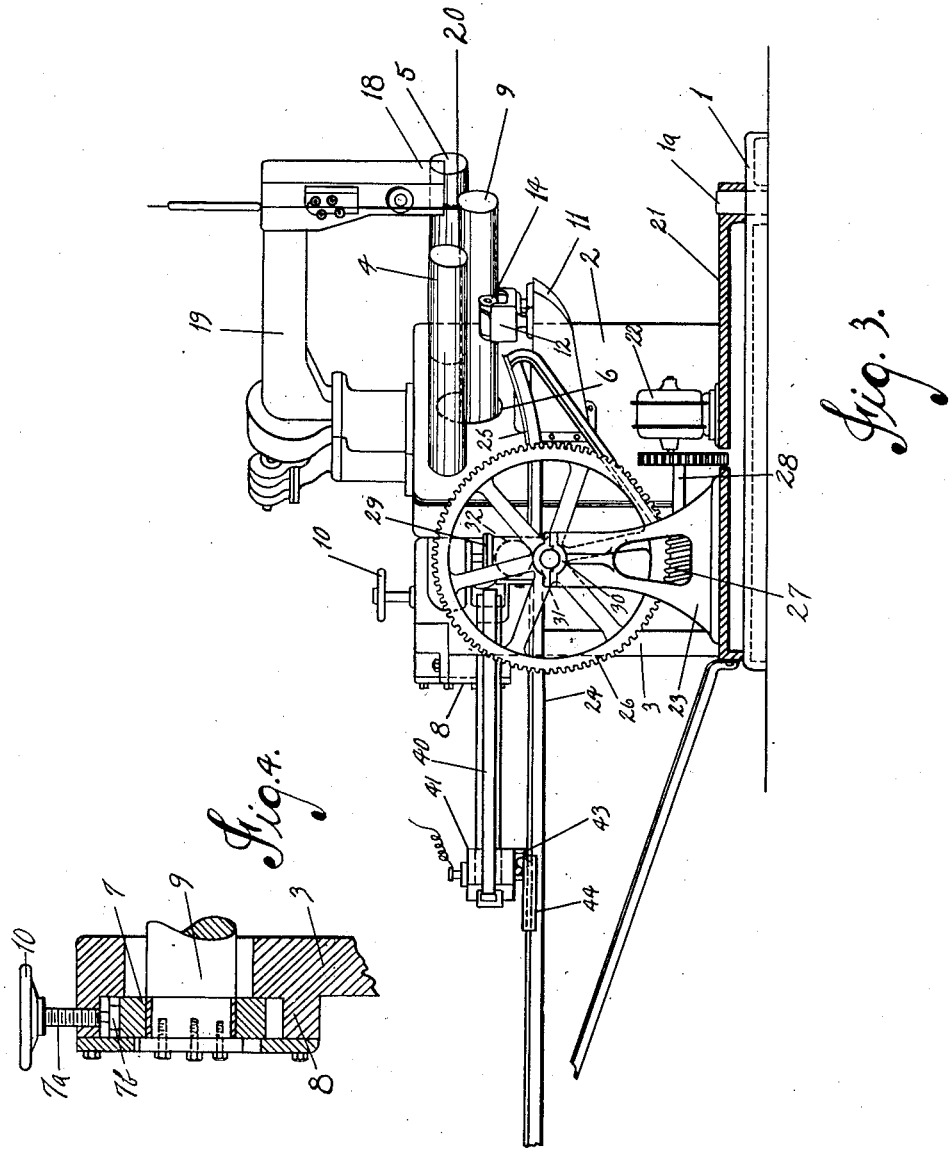
INVENTOR.
Jonathan R. Freeze
BY Allen & Allen
ATTORNEYS Feb. 17, 1931. J. R. FREEZE 1,793,282
SPIRAL PIPE FORMING METHOD
Original Filed Dec. 5, 1924  3 Sheets-Sheet 3
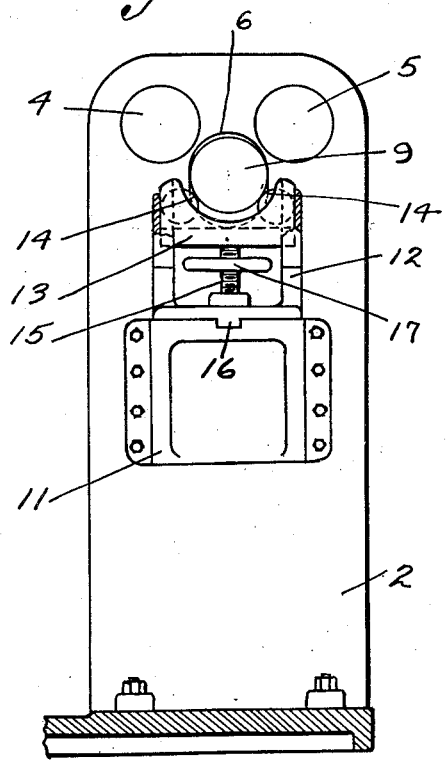
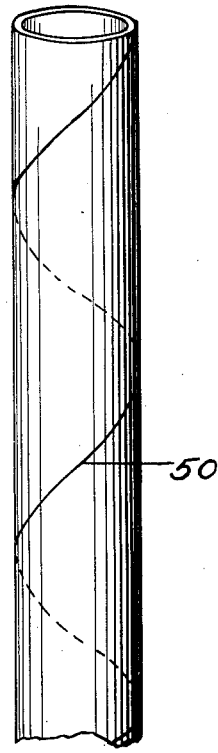
INVENTOR.
Jonathan R. Freeze
BY
Allen & Allen
ATTORNEYS.

Patented Feb. 17, 1931

1,793,282

UNITED STATES PATENT OFFICE

JONATHAN R. FREEZE, OF MIDDLETOWN, OHIO, ASSIGNOR TO THE AMERICAN ROLLING MILL COMPANY, OF MIDDLETOWN, OHIO, A CORPORATION OF OHIO

SPIRAL-PIPE-FORMING METHOD

Original application filed December 5, 1924, Serial No. 754,022. Divided and this application filed December 8, 1930. Serial No. 500,762.

My invention relates to methods for forming spiral pipe from sheet metal, and particularly to the formation of butt-welded spiral pipe, in which there is no overlap of the spiral turns upon each other, thereby providing a pipe with a smooth interior. This application is a division of my application Serial No. 754,022, filed December 5, 1924, and covers the process aspects thereof.

There have been proposed a number of ways of making spiral pipe, none of which are easy of operation, or as rapid as desirable. I know of no process in use prior to my invention which provides for the formation of spiral pipe which is butt-welded by arc welding applied continuously to the pipe as the spiral curves are developed in the sheet.

It is the object of my invention to provide an effective method for forming spirals in a sheet of metal, which device operates on the principle of forcing the sheet through the forming element, as distinguished from carrying it through a forming element by a movable part in engagement therewith.

It is my object to provide for adjustability with regard to pitch of the spiral and diameter of the pipe, and to provide for a mode of forming the spiral such that the advancing edge of the unformed metal sheet or strip will be in contact with the curved edge that is passing out of the former, to the end that arc welding can take place at this point in order to form butt-welded pipe. I do not wish to limit the application of my machine to butt-welded pipe, however, as it could be used for seamed pipe, riveted pipe and similar structures.

I accomplish my objects above stated and other advantages to be noted, such as welding pieces to each other endwise as they progress through the machine so as to form a continuously fed metal body without stoppage, by those certain method steps to be hereinafter more specifically pointed out and claimed.

In the drawings:—

Figure 3 is a front elevation of the device.

Figure 4 is a detail section of the rear sliding journal for the forming roll.

Figure 5 is a side elevation of the machine taken at about 45 degrees from Figure 3.

Figure 6 is a perspective view of a piece of spirally wound butt-welded pipe.

Figure 1:
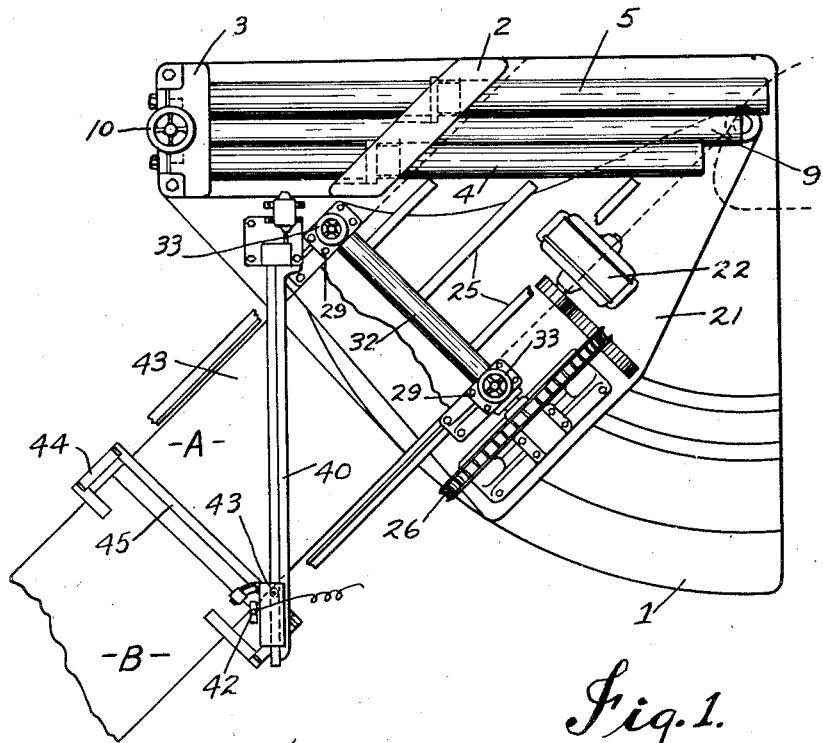
Figure 1 is a top plan view of the device.
Figure 2:
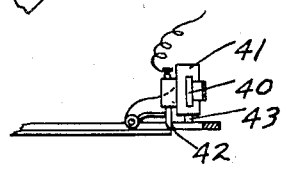
Figure 2 is a detail end elevation of the continuous welder.

The machine which is preferably used by me is formed on a base 1, from which projects a standard 2, and a standard 3. Arranged in the two standards, in this instance in fixed relation, are two round bars 4 and 5. These two bars may be made so as to revolve, or be driven, if desired, but in the simplest form selected for illustration the bars or rolls are fixed, and set in a horizontal plane, parallel with each other and interspaced. The roll or bar 4 is shorter than 5.

Arranged to slide in a vertical slot 6 in the standard 2, and set in a movable journal 7 in the standard 3 is a revolving idle roll 9, in this instance of the same diameter as the rolls 4 and 5. A hand wheel 10 controls the movable housing at the standard 3, and on a projection 11 from the standard 2 is a frame 12 in which slides a U-shaped block 13. This U-shaped block has a pair of rollers 14 therein, on which the front of the roll 9 finds a seat.

A screw 15 having its lower end threaded in the boss 16 of the frame 12, engages as an abutment against the block 13. The hand wheel 17 fast on the screw serves to revolve it and thus adjust the height of the support of the forward end of the roll 9. The roll 9 is held parallel and below the rolls or bars 4 and 5, and is of a length at the front end which lies between the lengths of the rolls 4 and 5.

The rear journal 7 slides in a bracket 8 mounted on the standard 2. The screw 7a is threaded through a boss on the top of the bracket and has a flanged head 7b engaging in a T slot in the top of the journal. The detail of this structure is not important, as any form of adjustable journal could be provided.

The base is provided with a post 1a which for a machine to make butt-welded pipe is placed under the end of the roll 9, which projects beyond the roll 4. Directly above the same point on the roll 4, is an arc welder of any desired type, as indicated at 18, supported on an arm 19 that is mounted on a projection from the standard 2 and extends so that its welding point at 20 is on the top of the roll 9 directly above the center of the post 1a. In its essence my method is concerned with the formation of an arc-welded, butt-jointed spiral pipe, continuously, irrespective of the machine employed.

A frame is mounted on the post 1a, so as to revolve thereon. This frame has a base 21 on which is a motor 22. It has a vertical standard 23, which supports a table 24. The table has some material supporting brackets 25, which project toward the three rolls and are bent slightly upwardly to carry a piece of metal into the space between the roll 4 and the roll 9.

On the standard 23 is a large bull gear 26 driven by a worm 27 on the motor driven shaft 28. There are two small two-high roll housings 29 of any desired type mounted at the sides of the table, in which the lower roll 30 is supported, this roll having a spindle 31 on which the bull gear is mounted. There is also mounted in said housings an upper roll 32, which is held down against the roll 30, by means of screws 33, in the usual manner in two-high pinch roll structures.

A detailed illustration of the roll housings is not believed to be called for, as it forms no pertinent detail of the invention and is a structure well known in the art.

From the description it will be evident that no matter what angle is given to the pinch roll table, by swinging it on the pivot post as an axis, a straight line drawn along the table that intersects the arc welding point on the lower forming roll, in any position, will intersect that point in any other position.

In the device shown the line so drawn will coincide with the right hand end of the pinch roll device, so that sheets fed along by the pinch rolls are kept over to the right, and the right hand advancing edge of the sheets will pass over the arc welding point. One of the important features of my method is that the piece is forced into the forming device.

The body of the sheet as fed or pushed forward, will be thrust up between roll 4 and roll 9 and be pushed over the top of roll 9 and under roll 5, this forming a spiral due to the angular line of feed. Another important feature of my method is that while the welding takes place the piece is under the tension incident to a three point contact and that the piece is not wrapped around a mandrel or forced to conform to the interior of a hollow forming element.

The angle to which the feed device is swung controls the pitch of the spiral. The adjustment of the roll 9 controls the diameter of the spiral. Thus the roll 9 may be adjusted downwardly until the sheet will pass clear without any distortion under the roll 9, in which there would be no curve at all. As the roll 9 is pressed more and more upwardly the curve becomes of less and less radius until the diameter of the spiral formed would be approximately that of the roll 9.

The angular adjustment of the sheet feeding means depends upon the desires of the operator as to the relation of the meeting edges of the spiral bends. In a process for forming butt-welded pipe, the frame will be swung to such an angle that the pitch of the spiral will bring the left hand edge of the piece after it has been bent, into coincidence with the advancing right hand edge of the unbent metal. When the sheet or strip of metal is narrow the pitch of the spiral will have to be different from that when the sheet or strip is wide, as will be obvious from consideration of the resultant bending action imparted to the metal.

Since the right hand edge of the piece is advanced in the particular construction described so that it passes directly under a continuous welding arc, it is evident that by controlling the spiral to the desired degree, the left hand edge of the metal already bent, can be brought into butted relation with the said right hand edge, and a continuous butt-welded joint formed simultaneously with the feeding of the metal. Also it is evident that the formed spiral pipe will feed directly off the end of the middle or lower roll, rotating as it does on its own axis, so that once started the machine will form butt-welded pipe of the length that metal is provided to accomplish.

In order to avoid stoppage until a pipe of the desired length has been formed, I provide an arm of T-shape in cross section, as indicated at 40, which extends at an angle across the feed table. Sliding on this arm is an arc welder 41, having the welding point at 42. The welder box has a depending roller 43, by means of which it is fed.

When a sheet A comes to an end, during its feed by the pinch rolls, the operator clamps another sheet B to it, in such a relation as to butt against the rear edge of sheet A. The clamp as indicated at 44, has a cross bar 45 which will lie on the top of sheet A.

When the cross bar hits the roller 43, the arc welder is forced along the bar, taking a path slantwise of the feed table, moving in time with sheet A. The welding is started along the butt joint at the right, and the travel of the welder will be across the sheet, maintaining its relation of welding all the way across the butt joint.

Thus the operator will provide endwise welded pieces of metal to the machine, in order to make the desired length of pipe. The cross welder has been shown close up to the pinch rolls, and if it's too difficult to take off the clamp without stopping the machine, the welder device will be moved further away from the rolls. The method of providing a continuous feed of material by a traveling welder is another feature of my method, and other mechanism or a hand welder would answer the process requirements.

The pipe formed by my machine is illustrated in Figure 6. The butt-joint 50 is welded on the outside of the spiral leaving the interior of the pipe smooth.

The use of the two fixed rolls, in connection with the adjustable intermediate roll, is the simplest mode in which my object can be accomplished, since if the rolls 4 and 5 were duplicated in a circular arrangement around the central roll, the adjustment for diameter of pipe could not be so easily accomplished. Such an arrangement would operate well as a spiral forming device, however, operating on a similar principle to the structure described.

One of the great advantages of my method is that there is but little power required, since the sheet is not formed by a clamping action, and is not forced lengthwise through a tubular mandrel, as has been proposed in riveted pipe.

Having thus described my invention, what I claim as new and desire to secure by Letters Patent, is:—

1. A process for making sheet metal pipe which consists in forming a piece of strip metal continuously into a spiral and abutting the advancing edge of the strip against the formed spiral edge during the forming, and continuously applying an electric arc weld to the said edges at said point of abutment.

2. A process for making sheet metal pipe which consists in forming a piece of strip metal continuously into a spiral, bringing the advancing edge and the previously formed spiral edge together while holding them and under compression, and electric arc welding said edges to each other where they are so brought together to form a welded spiral pipe.

3. A process for making sheet metal pipe which consists in forming a piece of strip metal continuously into a spiral, bringing the advancing edge and the previously formed spiral edge together, supporting said edges from beneath, where they are brought together, applying compressive strain to said edges where they are brought together and supported and applying a continuous electric arc weld to said edges at said point.

4. A process for making sheet metal pipe comprising the rolling of a continuous strip of sheet metal in the form of a spiral, the edges of said strip being butted together in the spiral, and passing an electric arc from a strip of welding metal along and to said abutting edges for the purpose of welding same together.

5. A process of making sheet metal pipe comprising continuously feeding a strip of sheet metal to a former at an angle to form a spiral; forcing the edge of the oncoming strip against the edge of the strip previously rolled to a contact under an electric arc for the purpose of continuously welding the edge of the oncoming strip to the edge of the strip previously rolled.

6. The process of forming a relatively long metal plate in a closed spiral formation to form a continuous-walled, non-lapped tube comprising; imparting a traveling motion to said plate; continuously projecting a closed spiral from one edge of said traveling plate and maintaining an electric arc over the edge of said plate and said abutting spiral so that both said edges will continuously pass under said arc to fuse it to said spiral.

7. A process for making spiral pipe comprising continuously feeding a strip of sheet metal on to a rotating mandrel in the form of a spiral; forcing the edge of the oncoming strip against the edge of the strip as previously rolled and continuously abutting said edges; simultaneously feeding a strip of welding metal into close proximity to said continuously abutting edges and passing an electric arc between said edges and said welding metal thereby fusing said edges and said welding metal into a homogeneous whole.

8. A process for forming sheet metal pipe comprising in combination continuously wrapping a relatively wide and relatively thin sheet of metal in a spiral, rotating said spiral so that additional sheet will be constantly added to said spiral; causing the edge of the additional sheet to continuously contact with the edge of the sheet in said spiral at a continuously advancing initial contact point as said additional sheet enters said spiral; and maintaining an electric arc substantially over said initial contact point during the formation of said spiral so as to continuously butt-weld said additional sheet to the sheet in said spiral as said spiral is formed.

9. A process for making sheet metal pipe comprising the rolling of a continuous strip of sheet metal about a mandrel in the form of a spiral; the edges of said strip being butted together in the spiral and maintaining an electric arc adjacent the point of first contact of said butted together edges for the purpose of welding same together.

10. The process of forming sheet metal pipe comprising, in combination: continuously forming one extremity of a relatively long plate of metal into a spiral; rotating said spiral so as to bring the incoming sheet into contact therewith at a continuously advancing initial contact point; maintaining an electric arc substantially over said initial contact point so as to continuously fuse the edge of the incoming sheet to the edge of said spiral; as it continuously contacts therewith during the formation of the spiral.

11. The process of forming sheet metal pipe comprising: in combination; continuously forming one extremity of a relatively long plate of metal into a spiral; rotating said spiral so as to bring the incoming sheet into contact therewith at a continuously advancing initial contact point; maintaining an electric arc substantially over said initial contact point so as to continuously fuse the edge of the incoming sheet to the edge of said spiral, as the former continuously aligns with the latter during the formation of the spiral; and maintaining a surface beneath said initial point so as to prevent said arc from forming a projection on the interior of said spiral.

12. The process of forming sheet metal pipe comprising: in combination; continuously forming one extremity of a relatively long plate of metal into a spiral; rotating said spiral so as to bring the incoming sheet into contact therewith at a continuously advancing initial contact point; maintaining an electric arc substantially over said initial contact point so as to continuously fuse the edge of the incoming sheet to the edge of said spiral; as it continuously aligns with the latter during the formation of the spiral, said fused metal being allowed to chill without external pressure so as to allow the formation of a projection on the exterior of said spiral.

13. The process of forming sheet metal pipe comprising in combination, forming a relatively long sheet of metal into a closed spiral with abutting and aligned edges; fusing the edges of the sheet together in the spiral and allowing said fused edges to solidify without external pressure.

JONATHAN R. FREEZE.